US008623215B2

(12) United States Patent
Rolchigo et al.

(10) Patent No.: US 8,623,215 B2
(45) Date of Patent: Jan. 7, 2014

(54) MEMBRANE MODULE FOR FLUID FILTRATION

(75) Inventors: Philip M. Rolchigo, Eden Prairie, MN (US); John H. Burban, Lake Elmo, MN (US); John Shanahan, White Bear Lake, MN (US); Robert O. Crowder, Lino Lakes, MN (US)

(73) Assignee: Porous Media Corporation, St. Paul, MN (US)

( * ) Notice: Subject to any disclaimer, the term of this patent is extended or adjusted under 35 U.S.C. 154(b) by 0 days.

(21) Appl. No.: 12/986,594

(22) Filed: Jan. 7, 2011

(65) Prior Publication Data

US 2011/0100895 A1   May 5, 2011

Related U.S. Application Data

(62) Division of application No. 12/683,371, filed on Jan. 6, 2010, which is a division of application No. 12/399,487, filed on Mar. 6, 2009, now Pat. No. 7,875,176.

(51) Int. Cl.
*B01D 61/00*     (2006.01)
*B01D 63/00*     (2006.01)
*B01D 39/00*     (2006.01)

(52) U.S. Cl.
USPC ........ 210/650; 210/321.8; 210/760; 210/263; 210/321.87; 210/500.23

(58) Field of Classification Search
USPC ............ 210/500.23, 321.8, 321.87, 650, 263, 210/760, 264, 321.78; 95/45; 96/10
See application file for complete search history.

(56) References Cited

U.S. PATENT DOCUMENTS

| | | | |
|---|---|---|---|
| 4,430,219 A * | 2/1984 | Kuzumoto et al. | 210/321.88 |
| 4,865,736 A | 9/1989 | Coplan | |
| 4,881,955 A | 11/1989 | Bikson et al. | |
| 5,026,479 A | 6/1991 | Bikson et al. | |
| 5,411,662 A | 5/1995 | Nicolas, Jr. et al. | |
| 5,837,033 A * | 11/1998 | Giglia et al. | 95/45 |
| 5,897,729 A | 4/1999 | Bikson et al. | |
| 6,585,808 B2 | 7/2003 | Burban et al. | |
| 6,616,735 B1 | 9/2003 | Burban et al. | |
| 6,779,522 B2 | 8/2004 | Smith et al. | |
| 7,351,335 B2 * | 4/2008 | Broens et al. | 210/202 |
| 7,410,580 B2 * | 8/2008 | Koch et al. | 210/321.79 |
| 7,465,393 B2 | 12/2008 | Kouters et al. | |
| 7,998,254 B2 | 8/2011 | Burban et al. | |

* cited by examiner

*Primary Examiner* — Ana Fortuna
(74) *Attorney, Agent, or Firm* — Quarles & Brady LLP

(57) ABSTRACT

Embodiments of the invention provide a membrane module including a first plurality of fibers capable of filtering fluids that are helically wound in layers creating a mono helix. Fluids to be treated can flow radially with respect to a longitudinal axis of the mono helix or parallel to the longitudinal axis of the mono helix. The membrane module can further include a second plurality of fibers that are helically wound with the first plurality of fibers to create a dual helix. The second plurality of fibers can have different properties than the first plurality of fibers in order to achieve different filtering functionalities.

19 Claims, 9 Drawing Sheets

MEMBRANE MODULE FOR FLUID FILTRATION

RELATED APPLICATIONS

This application is a divisional of U.S. patent application Ser. No. 12/683,371 filed on Jan. 6, 2010, which is a divisional of U.S. patent application Ser. No. 12/399,487, filed Mar. 6, 2009, now U.S. Pat. No. 7,875,176 the entire contents of which are incorporated herein by reference.

BACKGROUND

Membrane bioreactors (MBRs) are widely used for wastewater treatment because of their improved performance resulting in better water quality and minimal space requirements compared to conventional treatment processes. MBRs include immersed porous membranes to extract clean water (i.e., permeate water) from waste that is mixed with a biomass including active aerobic organisms. This mixture of waste and biomass is generally called a mixed liquor. The immersed membranes generally include tubular hollow fiber membranes or plate-type filtration membranes. Permeate water is removed from the mixed liquor by passing through the pores of the membranes.

Membrane fouling remains a significant challenge for conventional MBRs. This is due to the accumulation of soluble and particulate materials from the mixed liquor onto and into the porous membranes. Fouling of the porous membranes leads to increased energy costs, poor operating conditions, poor efficiency, and frequent membrane replacement. Conventional treatments for cleaning the porous membranes include aeration, intermittent permeation, permeate backwashing, air backwashing, and chemical cleaning. Aeration generally involves streams of large, coarse air bubbles being provided at the base of the membranes in order to scour the fibers as they float upward toward the top of the membranes. Aeration (both coarse and fine bubble aeration) is also used to circulate the mixed liquor to help re-suspend solids. Due to the air bubbles only being released at the base of the membranes, dead zones deprived of sufficient cleaning or circulation are often present in conventional MBRs. The other conventional treatments for cleaning the porous membranes require periodically stopping filtration, which increases energy costs and decreases permeate flow.

Some conventional MBRs use moveable fibers to help mitigate the fouling problem. The moveable fibers are fixed only at one end so that they can sway and rub against each other to help reduce fouling. However, breakage is a problem with these moveable fibers due to higher mechanical stress at their fixed ends, as well as abrasion due to rubbing against each other. As a result, these moveable fibers must be reinforced, which increases membrane costs.

SUMMARY

Some embodiments of the invention provide a membrane module including a plurality of fibers that are helically wound in layers. The plurality of fibers can be capable of filtering fluids. The plurality of fibers can create a mono helix through which fluids flow radially with respect to a longitudinal axis of the mono helix or parallel to the longitudinal axis of the mono helix.

Some embodiments of the invention provide a membrane module including a first plurality of fibers and a second plurality of fibers. The first plurality of fibers can be capable of filtering fluids. The second plurality of fibers can be helically wound along at least a portion of a length of the first plurality of fibers in order to create a dual helix. The second plurality of fibers can have different properties than the first plurality of fibers in order to achieve different filtering functionalities.

DETAILED DESCRIPTION

Figure 1:
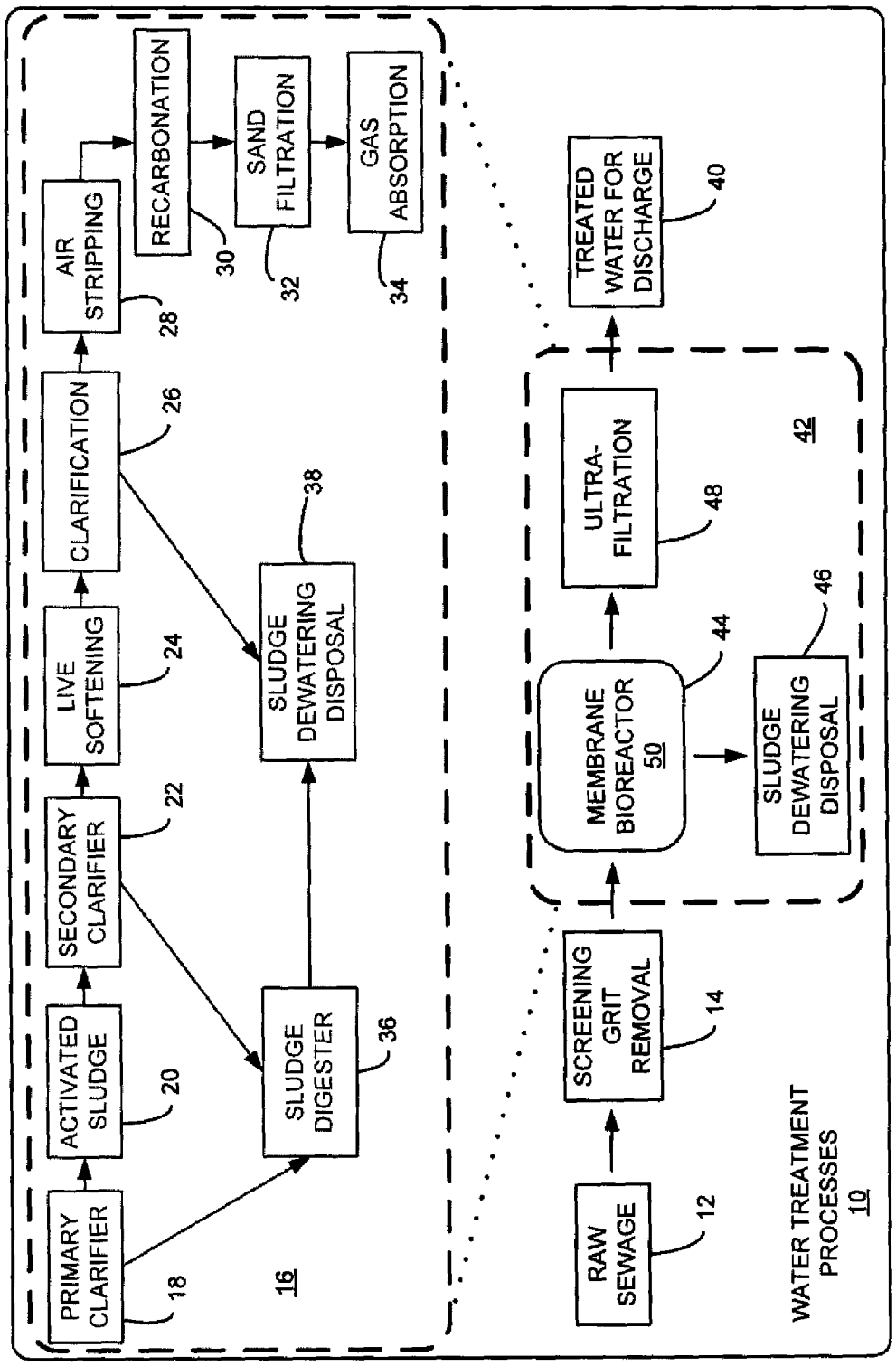
FIG. 1 is a flow chart of a wastewater treatment process including conventional non-MBR and MBR methods.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives and fall within the scope of embodiments of the invention.

Some embodiments of the invention provide a membrane module including a plurality of fibers that are helically wound in layers to create a mono helix. Other embodiments of the invention provide a membrane module including a first plurality of fibers and a second plurality of fibers that are helically wound to create a dual helix. The mono and dual helix membrane modules are capable of filtering fluids for purposes of various fluid filtration applications. For example, embodiments of the invention can be used in several general categories of applications, including drinking water purification, wastewater treatment, and industrial process water treatment. More specifically, embodiments of the invention can be used in various fluid treatment systems, including but not limited to, the following: MBR wastewater treatment systems, ultrafiltration chemical reactor systems, ultrafiltration membrane systems, dairy dewatering systems, protein fractionation systems, oil and water separation systems, gas addition systems, etc. Although embodiments of the invention can be used in each of these types of fluid filtration systems, the invention is generally described herein as being used in a MBR wastewater treatment process.

FIG. 1 illustrates non-MBR and MBR wastewater treatment processes 10. The water treatment processes 10 can be used in municipal, industrial, commercial, or residential wastewater treatment for various applications including, but not limited to, food and beverage production, chemical and pharmaceutical manufacturing, irrigation, landfill leachate, metal finishing and steel production, and pulp and paper processing. The first step includes collecting the water to be treated or the raw sewage (step 12). The raw sewage is then filtered through a screen to remove grit and larger objects (step 14). The process steps in box 16 (steps 18-38) represent steps during a non-MBR water treatment process. In the non-MBR process, the filtrate from the screening grit removal (step 14) goes through a primary clarifier to remove solids (step 18), and then into an aeration basin where the activated sludge removes or converts soluble contaminants (step 20). The activated sludge then goes through a secondary clarifier (step 22), a live softening process (step 24), another clarification process (step 26), air stripping (step 28), recarbonation (step 30), sand filtration (step 32), and gas absorption (step 34). Sludge removed during the primary and secondary clarifier (steps 18 and 22) is drained into a sludge digester to be broken down (step 36). Sludge from the sludge digester (step 36) and sludge removed during the other clarification process (step 26) is sent to the sludge dewatering disposal (step 38). The resulting filtrate from the gas absorption step (step 34) is the final treated water, ready to be discharged (step 40). Sludge can also be recirculated from the clarification process (step 26) to the secondary clarifier (step 22).

For a MBR water treatment process, the steps in box 16 (steps 18-38) can be replaced by the steps in box 42 (steps 44-48). The filtrate from the screening grit removal (step 14) is processed in a membrane bioreactor 50 (step 44) to separate water from sludge and remove soluble substances. Dewatered sludge (from step 44) can be removed by a sludge dewatering disposal (step 46). Permeate water from the membrane bioreactor 50 (from step 44) can be further filtered by ultrafiltration (step 48). Step 48 can be replaced by other filtration processes, such as microfiltration or nanofiltration, depending on the application. The resulting filtrate or permeate water from ultrafiltration (step 48) is the final treated water, ready to be discharged (step 40). As shown in FIG. 1, the use of the membrane bioreactor 50 can significantly simplify the water treatment process 10. In some embodiments of the invention, the components of the membrane bioreactor 50 (step 44) and the components of the ultrafiltration process (step 48) can be positioned in the same or separate tanks, chambers, or pressurized vessels.

Figure 2:
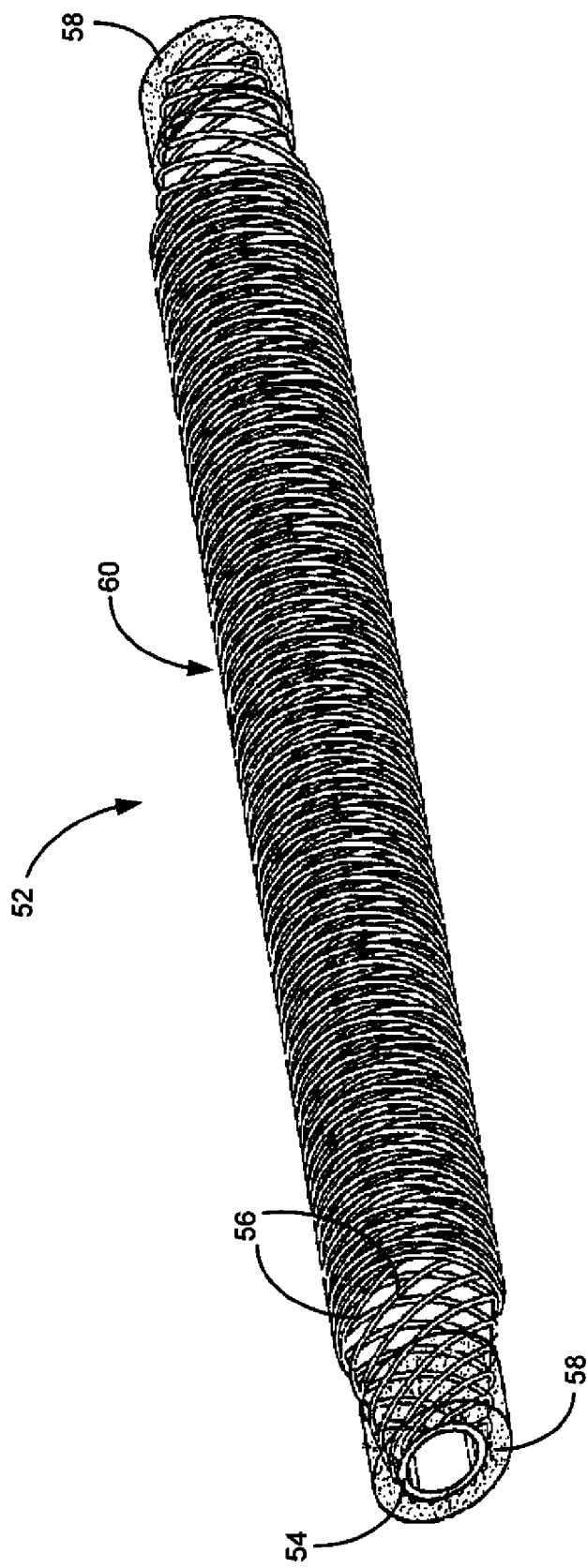
FIG. 2 is a perspective view of a mono-helix fiber membrane according to one embodiment of the invention.

FIG. 2 illustrates a mono-helix fiber membrane 52 according to one embodiment of the invention for use in the membrane bioreactor 50, for example. The mono-helix fiber membrane 52 can include a core 54 and fibers 56 helically wound around the core 54. Although the core 54 is shown as a cylinder with a circular cross-section in FIG. 2, some embodiments can include a core having other cross-sections, such as square, elliptical, triangular, etc. The core 54 can be a solid cylinder or a porous, hollow cylinder. In some embodiments, the inside of the core 54 can include a packed bed of filtration media. In some embodiments, the core 54 can be perforated at one or more portions along its length. An ultraviolet light source inside or outside the core 54 can be included, in some embodiments, for sterilization purposes. In other embodiments, the mono-helix fiber membrane 52 does not include a core 54, but rather the fibers 56 are helically wound into a similar cylindrical shape, with a supporting structure at either end.

In some embodiments, the fibers 56 can be permeable, hollow ultrafiltration membranes and can be coupled or potted (along with the core 54 or the supporting structures) at one or both ends to a header or tubesheet 58. The header 58 can be coupled to a permeate manifold in order to collect and direct permeate water. In other embodiments, the fibers 56 can be microfiltration or nanofiltration fibers.

The fibers 56 can be wound helically around the core 54 at a consistent or variable wind angle. The wind angle, defined with respect to the core 54 in a horizontal position, can be the angle at which the fiber 56 is laid across the core 54 with respect to the vertical axis. For example, fibers 56 wound at a 90-degree wind angle would be parallel to the horizontally-positioned core 54. The fibers 56 can be wound around the core 54 in layers, where a layer is defined as a fiber 56 wound from one end to the other end and the return of the fiber 56 to the first end constitutes another separate layer. In some embodiments, the fibers 56 can be wound as disclosed in United States Patent Application Publication No. 2008/0072754 in the names of Burban et al., the entire contents of which is herein incorporated by reference.

The layers of fibers 56 can be asymmetrically wound about the core 54 to create a mono helix 60. The density of the layers can change with respect to either a radial distance from a center of the core 54 or an axial distance from an end of the core 54. For example, the mono helix 60 can be more dense in an interior portion (i.e., closer to the center of the core 54) and become less dense in an exterior portion (i.e., further from the center of the core 54). In addition, the fibers 56 can vary in texture, cross-sectional shapes, surface structure, and/or dimensions (such as lumen size), in some embodiments.

Figure 3:
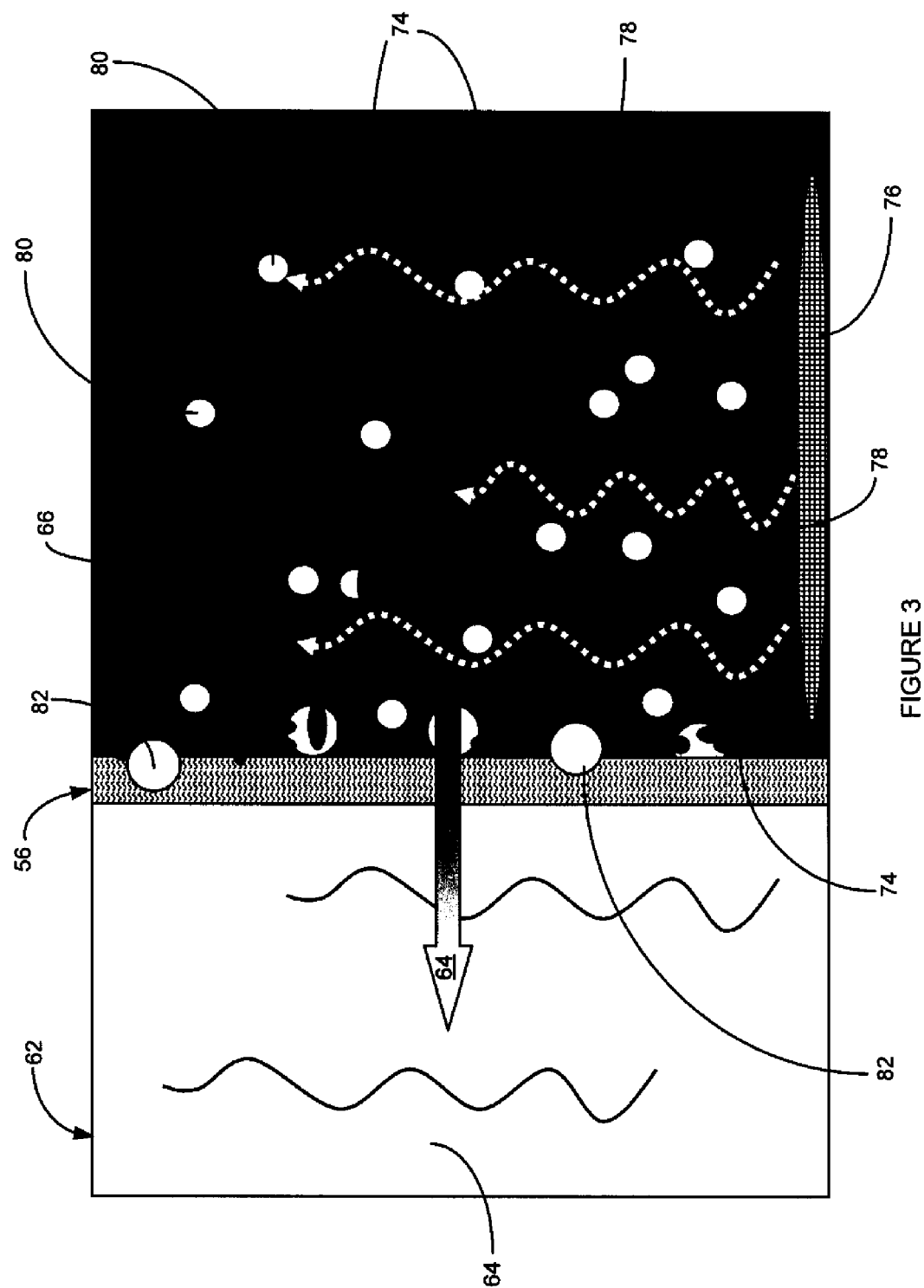
FIG. 3 is a schematic illustration of the mono-helix fiber membrane of FIG. 2 surrounded by a mixed liquor according to some embodiments of the invention.

The fibers 56 can be constructed of a polymeric, hydrophilic material with a lumen 62, as shown in FIG. 3. For example, the fibers 56 can be constructed of polysulfone, polyvinylidene fluoride, polyvinyl chloride, polyethylene, polypropylene, etc. The pressure inside of the lumens 62 can be lower than the pressure outside the fibers 56, creating a vacuum in the lumens 62. For example, a vacuum can be applied to the lumen 62 or the environment outside the fibers 56 and can be held at a pressure above atmospheric pressure. Due to the pressure difference, permeate water 64 from a surrounding mixed liquor 66 can be drawn through pores of the fibers 56 into the lumen 62 for an outside-in filtration configuration. In other embodiments, the fibers 56 can be used in an inside-out filtration configuration, where the mixed liquor 66 is circulated through the lumen 62 at a higher pressure and permeate water 64 is drawn outside of the fibers 56 through the pores to a lower-pressure environment. The pores of the fibers 56 can be consistent or variable in size and can be between about 0.01 microns and about 0.2 microns in diameter. The pores can also vary outside this range, depending on the application. In addition, the mono helix 60 can have consistent or varying patterned porosities along its axial length.

Figure 4:
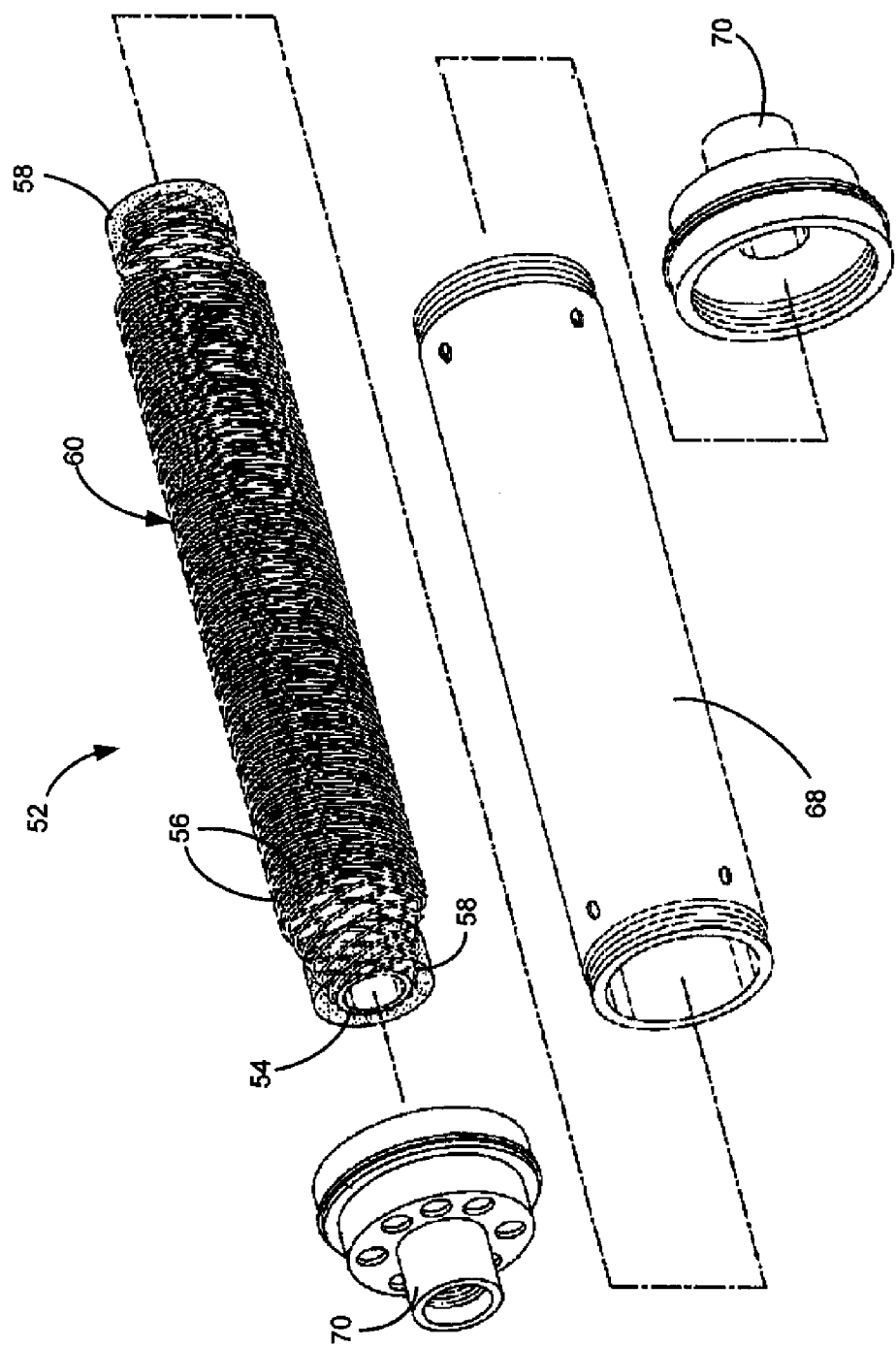
FIG. 4 is a perspective view of a membrane module including the mono-helix fiber membrane of FIG. 2 according to some embodiments of the invention.

In some embodiments, the mono-helix fiber membrane 52 can include one or more mono helixes 60 coupled together to the header 58 that is submersed in a membrane bioreactor tank. In other embodiments, as shown in FIG. 4, the mono-helix fiber membrane 52 can include one or more mono helixes 60 in a cylindrical housing or cartridge 68 with end caps 70. The mono helix or helixes 60 can be fixed at both ends to headers 58 so that the fibers 56 are substantially stationary or can be fixed at only one end to a single header 58 so that the fibers 56 are moveable (i.e., can sway).

In the stationary configuration, the use of the core 54 and the design of the mono helix 60 supports the fibers 56 and prevents them from breaking. Also, in the stationary configuration, the reinforcement of the core 54 and the mono helix 60 can allow reduced fiber maintenance, as well as the use of finer and cheaper fibers 56, reducing the cost of the mono-helix fiber membrane 52. In the dynamic configuration, the swaying motion can help reduce fouling on the fibers 56. In addition, the mechanical strength of the mono helix 60 reinforces the fibers 56 and prevents fiber breakage due to increased mechanical stresses from the swaying.

Figure 5:
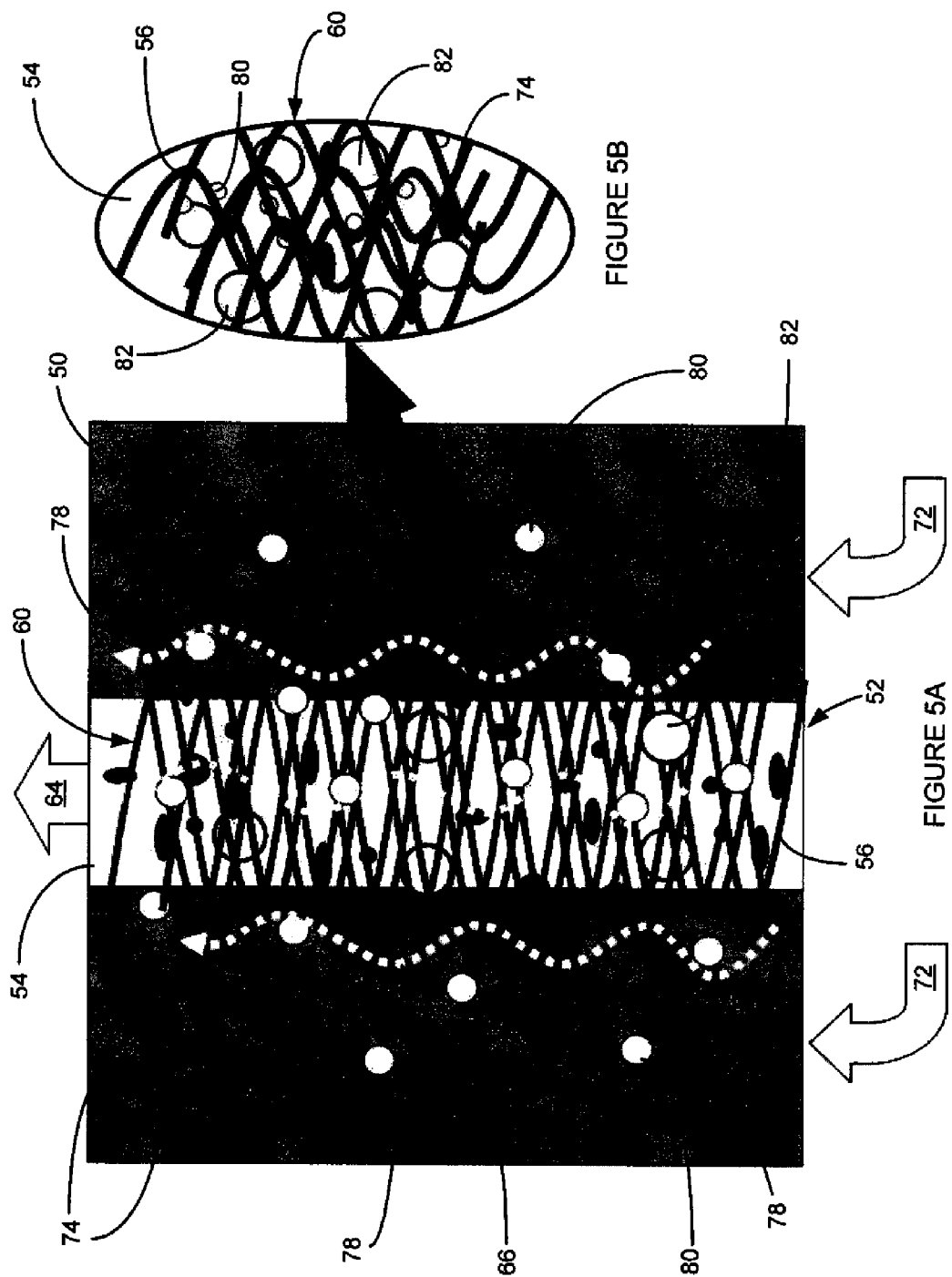
FIG. 5A is a schematic illustration of the mono-helix fiber membrane of FIG. 2 surrounded by a mixed liquor.
FIG. 5B is a close-up illustration of the mono-helix fiber membrane of FIG. 5A.

FIG. 5A is a schematic illustration of a portion of the MBR 50 with the mono-helix fiber membrane 52. Pressurized feed water 72 is introduced outside the mono-helix fiber membrane 52 into the mixed liquor 66. The mixed liquor 66 includes bacteria and protozoa to help breakdown large organic waste 74 and develop biological floc to maintain total suspended solids (TSS) in the mixed liquor 66.

As shown in FIG. 5A, the pressurized feed water 72 is introduced outside the fiber 56 into the mixed liquor 66 and permeate water 64 is drawn into the lumens 62 of the fibers 56. The permeate water 64 can then be carried out one or both ends of the fibers 56. In other embodiments, pressurized air can be used at one end of the fibers 56 to force permeate water 64 out of each fiber 56. In some embodiments, the core 54 is porous and can collect permeate water 64 from the fibers 56. The feed water 72 can be introduced near the bottom of the MBR 50. However, the feed water 72 can alternatively or additionally be introduced near the top and/or sides of the MBR 50.

Outside the fibers 56, air, oxygen, or other inert gases can be used to sparge the mixed liquor 66 using an aerator 76, as shown in FIGS. 3, 5A-5B, and 7A-7B. Dotted arrows 78 in FIGS. 3, 5A, and 7A indicate a direction of flow of small or fine bubbles 80 and large or coarse bubbles 82. The aerator 76 can introduce the fine bubbles 80 into the mixed liquor 66 for aeration and circulation. The aerator 76 or a separate aerator can introduce the coarse bubbles 82 for scouring to help reduce fouling on the fibers 56. The MBR 50 can also include an air sparge or back flush cycle to push high pressure air or permeate water 64 back through the fibers 56 to help reduce fouling on the fibers 56. The design of the helically-wound fibers 56, in some embodiments, can help capture solids and also can help back flush efficiency. Rather than, or in addition to the aerator 76, the core 54 can include an aerator to aerate and/or scour the mono helix 60.

Figure 6:
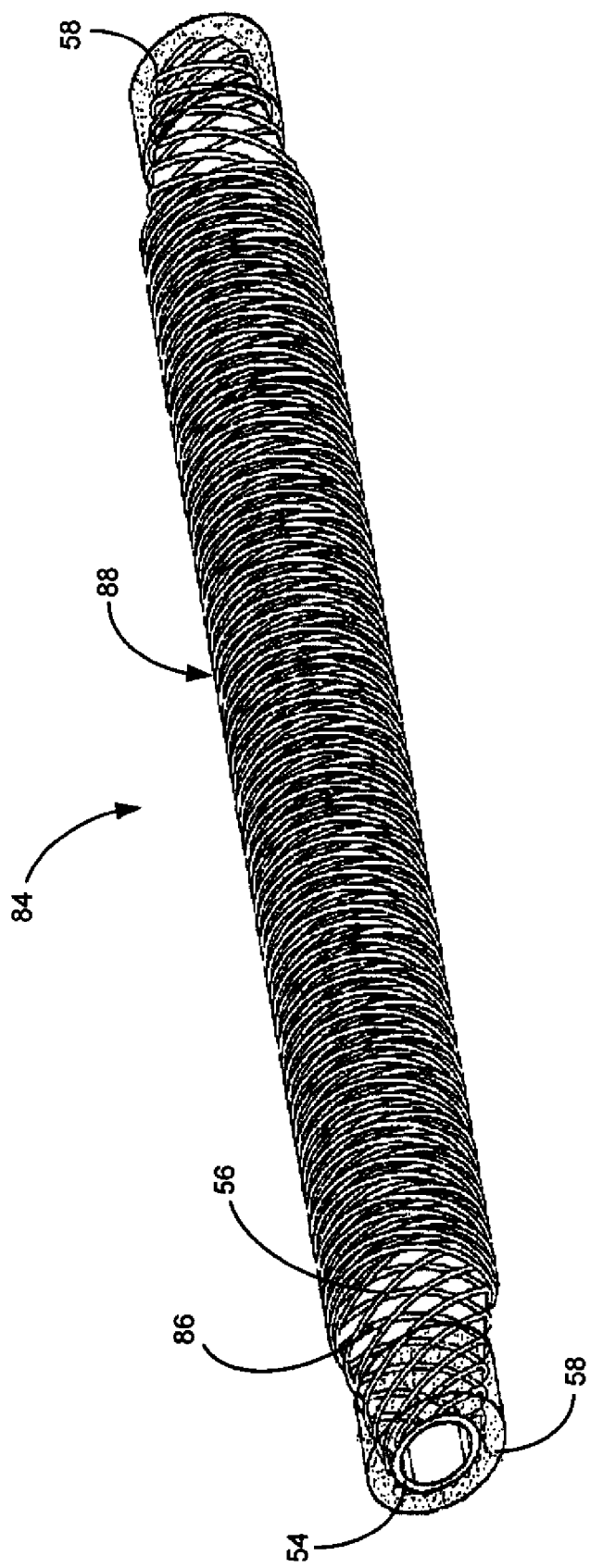
FIG. 6 is a perspective view of a dual-helix fiber membrane according to another embodiment of the invention.
Figures 7A, 7B:
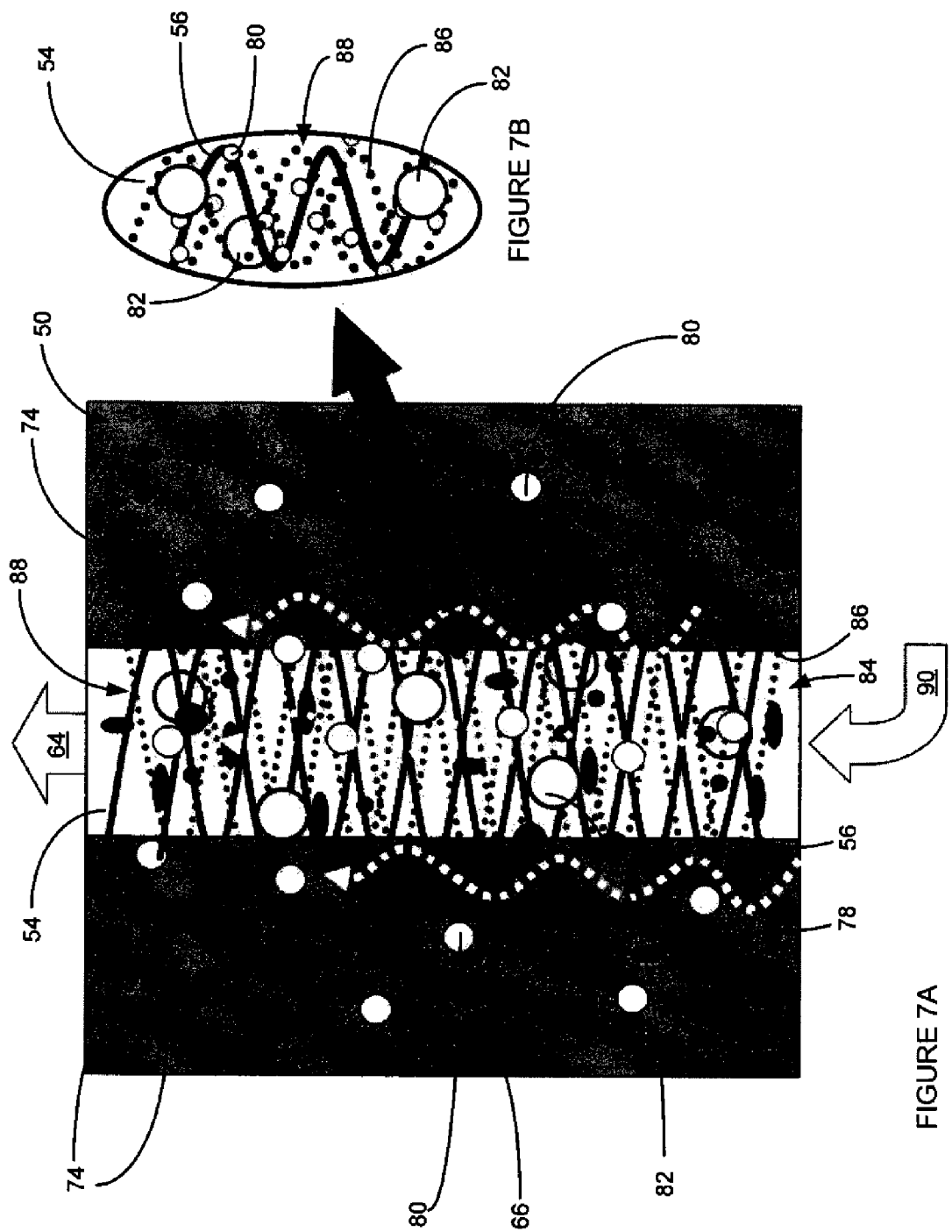
FIG. 7A is a schematic illustration of the dual-helix fiber membrane of FIG. 6 surrounded by a mixed liquor.
FIG. 7B is a close-up illustration of the dual-helix fiber membrane in FIG. 7A.

FIG. 6 illustrates a dual-helix fiber membrane 84 according to another embodiment of the invention. The dual-helix fiber membrane 84 can include a first set of fibers 56 and a second set of fibers 86 helically wound together around a core 54 and secured to headers 58. The layers of fibers 56 and 86 can be asymmetrically or symmetrically wound around the core 54 to create a dual helix 88. The second set of fibers 86 can be hydrophobic or hydrophillic, microporous fibers with pores of about 0.1 microns in diameter, in some embodiments. The second set of fibers 86 can be used to deliver gas, air, or oxygen to scour the dual helix 88 and/or aerate the mixed liquor 66 in a localized manner. For example, aeration can be provided by the second set of fibers 86 in very close proximity to the first set of fibers 56. As shown in FIG. 7A, gas 90 can be provided to the interior or lumen of the second set of fibers 86 at a pressure above local hydrostatic pressure. The gas 90 will then be delivered out from the pores around the dual helix 88.

The core 54 and the sets of fibers 56, 86 can be constructed and can be operated similar to the mono-helix fiber membrane 52 described above. For example, in some embodiments, the MBR 50 can include one or more dual-helix fiber membranes 86 coupled together to a permeate water manifold and submersed in a membrane bioreactor tank. In other embodiments, the MBR 50 can include a single dual-helix fiber membrane 84 in a cylindrical housing, or cartridge 68, with end caps 70, as shown in FIG. 4. The dual helix or helixes 88 can be fixed at both ends to headers 58 so that the sets of fibers 56, 86 are substantially stationary or can be fixed at only one end to a single manifold 58 so that the sets of fibers 56, 86 are moveable (i.e., can sway). In some embodiments, the layers of the dual helix 88 can be regularly intertwined as follows: fibers 56, fibers 86, fibers 56, fibers 86, etc., where different sizes of the fibers 56, 86 can help define spacing between layers. In other embodiments, the layering of the sets of fibers 56, 86 in the dual helix 88 can be relatively random.

As shown in FIGS. 7A and 7B, the second set of fibers 86 can allow the gas 90 to be delivered locally along the length of the dual helix 88. The dual helix 88 can increase the effectiveness of scouring, because conventional scouring techniques generally only release air from an aerator at one end of the MBR 50. Local aeration with the second set of fibers 86 can help prevent the development of dead zones in the MBR 50. In addition, the dual helix 88 can also decrease energy usage, as the pressure only needs to be great enough to diffuse gas out into a small, localized area, rather than up the entire length of the MBR 50. Also, back flushing periods are needed less frequently.

The dual helix 88 can have consistent or varying distribution characteristics in both sets of fibers 56, 86, such as patterned porosities, densities, texture, surface structure, cross-sectional shapes, and/or dimensions (such as lumen size). The varying patterned porosities and densities can allow controllable local environments and improve bio-reactivity by permitting combined aerobic and anaerobic conditions or various bubble sizes in the second set of fibers 86 in the MBR 50.

The structured designs of the mono helix 60 and the dual helix 88 can offer controlled spacing between sets of fibers 56 and/or 86. The varying density from interior to exterior portions can allow better fluid-to-fiber contact and more surface area, in comparison to conventional random-packing fiber designs.

As shown in FIG. 7A, pressurized feed water 72 can be introduced outside the sets of fibers 56 and 86 into the mixed liquor 66 and permeate water 64 can be drawn through the lumen 62 of the first set of fibers 56. In some embodiments, vacuum can be applied to the lumen 62 to create a pressure driving force to drive the permeate water 64 through the lumen 62. In some embodiments, a combination of a pressurized feed of fluid to be treated and a vacuum applied to the lumen 62 can create a pressure driving force to drive the permeate water 64 through the lumen 62. The permeate water 64 can then be carried out one or both ends of the first set of fibers 56. In some embodiments, the core 54 is porous and can collect permeate water 64 from the first set of fibers 56. As shown in FIGS. 7A and 7B, the second set of fibers 86 can release air to scour the dual helix 88 with coarse bubbles 82 and reduce fouling. In some embodiments, the localized scouring of the first set of fibers 56 can temporarily reduce or substantially stop the permeate flux through the first set of fibers 56.

In some embodiments, portions of the dual helix 88 can include bacteria-promoting chemicals and/or the dual helix 88 can include varying surface energy zones along its length to promote various bacterial growth patterns. Also, portions of the dual helix 88 can include varying fiber chemistries in order to create anaerobic and aerobic zones for particular bacteria.

In some embodiments, one or more types of additional filtration media (not shown) can be wrapped around the core 54 between the sets of fibers 56 and/or 86. The additional filtration media can be another set of fibers and/or a porous sheet and can be structured to achieve aeration and/or filtration functions for specific applications. The additional filtration media can also help define spacing between the layers of the sets of fibers 56 and/or 86 and can act as a support for a biofilm.

In some embodiments, the permeate water 64 collected from the MBR 50 can be further filtered with another filtering device, such as a reverse osmosis (RO) module (not shown). In some embodiments, the permeate water 64 that feeds the RO module can also be recycled through the lumen 62 of the first set of fibers 56. Salts and organics from the permeate water 64 in the lumen 62 can accumulate to a steady state, and the salts can create an osmotic draw of the permeate water 64, lowering the energy required to achieve a constant permeate flux. In addition, the organics can diffuse back into the mixed liquor 66, improving the efficiency of biological digestion. The salts can also have a local anti-fouling effect, acting as a bactericide on the surfaces of the sets of fibers 56, 86.

Figure 8:
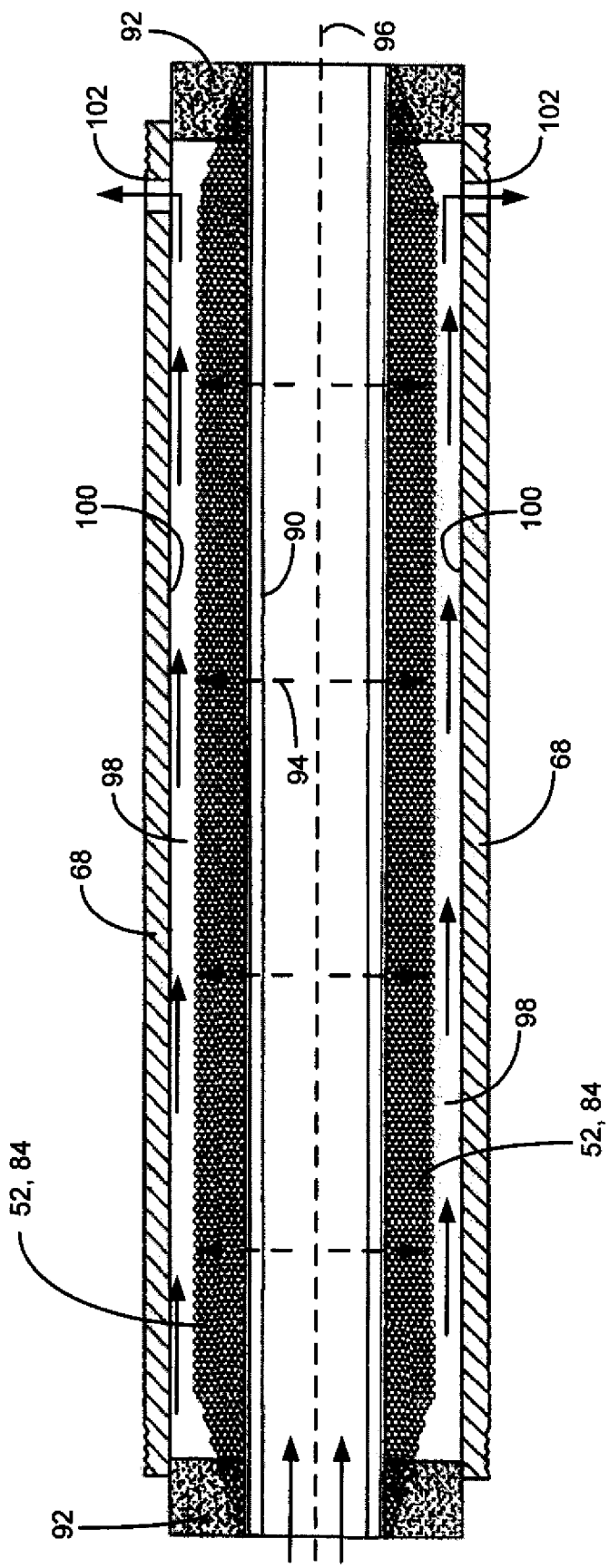
FIG. 8 is a cross-sectional view of a mono-helix or dual-helix membrane module through which fluid flows radially.

According to some embodiments of the invention, FIG. 8 illustrates radial flow of fluid through the mono-helix fiber membrane 52 or the dual-helix fiber membrane 84. In the radial flow mode, the mono-helix fiber membrane 52 or the dual-helix fiber membrane 84 can be wound around a core 90, positioned in the cylindrical housing or cartridge 68, and secured with headers or tubesheets 92. Fluid to be treated can be directed into the interior of the core 90 and can then flow radially outward through the mono-helix fiber membrane 52 or the dual-helix fiber membrane 84. The core 90 can be perforated or otherwise sufficiently porous to allow fluid to flow through it radially. The fluid can flow radially (as indicated by arrows 94) with respect to a longitudinal axis 96 of the mono-helix fiber membrane 52, the dual-helix fiber membrane 84, and/or the core 90. The fluid can then flow into a space 98 adjacent to an internal annular wall 100 of the cartridge 68 and then toward one or more outlets 102. This radial flow of fluid can help reduce the fluid pressure drop across the membrane, while still providing enough residence time to achieve filtration. Although shown positioned inside a cartridge 68, the mono-helix fiber membrane 52 or the dual-helix fiber membrane 84 can be submerged in a open chamber or tank.

Figure 9:
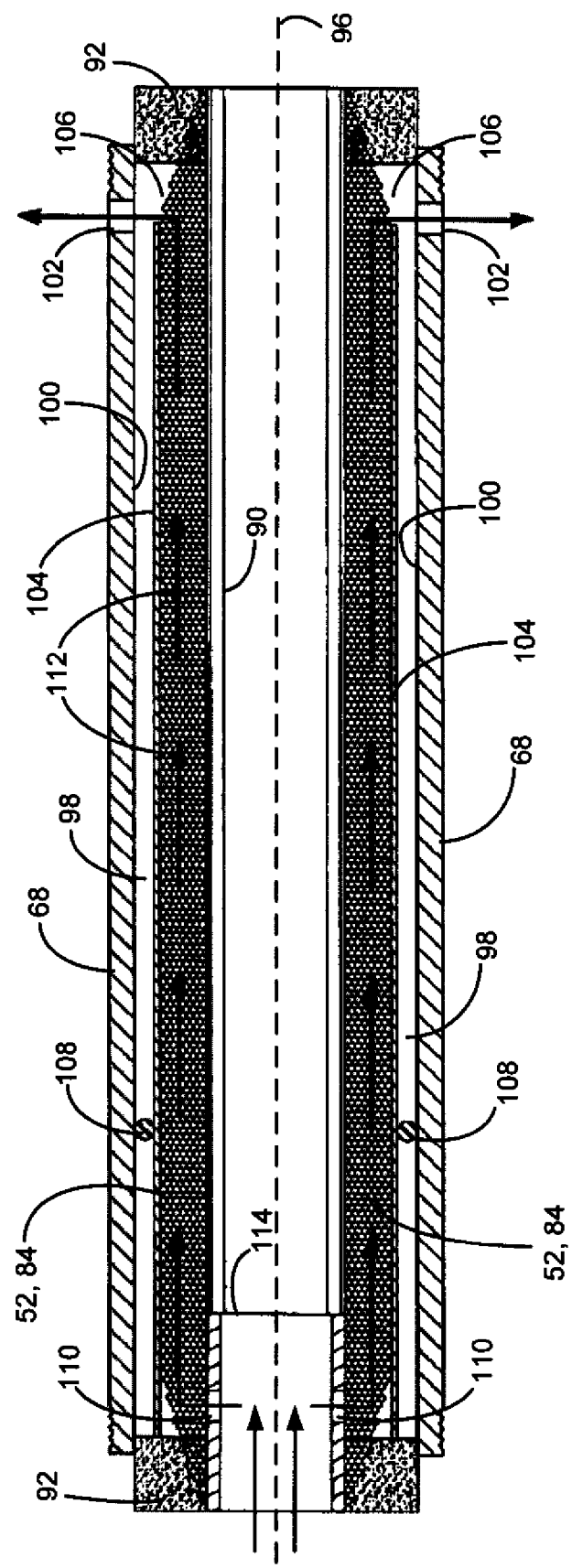
FIG. 9 is a cross-sectional view of a mono-helix or dual-helix membrane module through which fluid flows parallel to the membrane and core.

According to some embodiments of the invention, FIG. 9 illustrates parallel flow of fluid through the mono-helix fiber membrane 52 or the dual-helix fiber membrane 84. The mono-helix fiber membrane 52 or the dual-helix fiber membrane 84 can be wound around the core 90, positioned in the cylindrical housing or cartridge 68, and secured with headers or tubesheets 92. An impervious wrap 104 can be wrapped around the mono-helix fiber membrane 52 or the dual-helix fiber membrane 84. The entire mono-helix fiber membrane 52 or dual-helix fiber membrane 84 between the tubesheets 92 can be covered with the impervious wrap 104, except for an open portion 106 (e.g., a portion adjacent to one of the tubesheets 92). A seal 108 can be placed between the impervious wrap 104 and the internal annular wall 100 of the cartridge 68.

Fluid to be treated can be directed into the interior of the core 90 and can then flow through one or more passageways 110 to the mono-helix fiber membrane 52 or the dual-helix fiber membrane 84. Due to the impervious wrap 104 and/or the seal 108, the fluid entering through the passageways 110 can flow down the length of the mono-helix fiber membrane 52 or the dual-helix fiber membrane 84 until it reaches the open portion 106, where it can flow toward the outlets 102. The fluid can flow parallel (as indicated by arrows 112) to the longitudinal axis 96 of the mono-helix fiber membrane 52, the dual-helix fiber membrane 84, and/or the core 90. The core 90 can include a "dead-end" 114 to ensure that all fluid flows through the passageways 110 toward the mono-helix fiber membrane 52 or the dual-helix fiber membrane 84. Although shown positioned inside a cartridge 68, the mono-helix fiber membrane 52 or the dual-helix fiber membrane 84 can be submerged in a open chamber or tank.

During the process of fluid filtration, some or all of the fluid permeates through the membrane walls of the fibers. As a result, there is a decrease in volumetric flow of the fluid on the outside of the fibers. In a membrane module with a constant packing fraction for the fibers or a constant cross-sectional area between the fibers, this decrease in volumetric flow results in a decrease in the velocity of the fluid. Also, as fluid permeates through the membrane walls, the remaining fluid becomes more concentrated in the particles and species rejected by the membrane walls. These two phenomenon of reduced velocity and increased concentration reduce the mass transfer performance of the membrane and a reduction in performance is often observed.

In some embodiments of the invention, the winding parameters of the fibers in the membrane module can be altered in order to increase the packing fraction of the fibers in the direction of fluid flow (i.e., to pack the fibers more tightly). Increasing the packing fraction of the fibers results in decreasing the free space between the outside of the fibers. In other words, the cross-sectional area where fluid flows between the fibers decreases in the direction of fluid flow. In this manner, some embodiments of the invention can be used to maintain a higher fluid velocity and high mass transfer efficiency.

The increase in packing fraction and decrease in cross-sectional area between the fibers can be used in the radial flow mode of FIG. 8 or the cross flow mode of FIG. 9 in situations where extra flow recirculation is often used to offset the reduction in fluid velocity. In FIG. 8, the packing fraction can be increased in the direction of the radial flow (as indicated by arrows 94) to maintain fluid flow velocity on the outside of the fibers. In other words, the fibers can be packed more loosely adjacent to the core 90 and more tightly as the distance between the fibers and the core 90 increases. More specifically, each layer of fibers can be wound using a different packing fraction in order to compensate for the drop in fluid velocity as the fluid flows radially outward away from the core 90. In FIG. 9, the packing fraction can be increased in the direction of fluid flow (as indicated by the arrows 112). This increase in packing fraction can result in a smaller diameter at one end of the mono or dual helix. Alternatively, this increase in packing fraction can result in the mono or dual helix being more dense at one end with the same diameter along its longitudinal length.

The increase in packing fraction and decrease in cross-sectional area between the fibers can also be used in the radial flow dead-end mode of FIG. 8 or the parallel flow dead-end mode of FIG. 9 where substantially all the fluid permeates through the membrane walls. In FIG. 8, the packing fraction can be increased in the direction of the radial flow (as indicated by the arrows 94) to maintain fluid flow velocity on the outside of the fibers. In other words, the fibers can be packed more loosely adjacent to the core 90 and more tightly as the distance between the fibers and the core 90 increases. More specifically, each layer of fibers can be wound using a different packing fraction in order to compensate for the drop in fluid velocity as the fluid flows radially outward away from the core 90. In FIG. 9, the packing fraction can be increased in the direction of fluid flow (as indicated by the arrows 112). This increase in packing fraction can result in a smaller diameter at one end of the mono or dual helix. Alternatively, this increase in packing fraction can result in the mono or dual helix being more dense at one end with the same diameter along its longitudinal length.

It will be appreciated by those skilled in the art that while the invention has been described above in connection with particular embodiments and examples, the invention is not necessarily so limited, and that numerous other embodiments, examples, uses, modifications and departures from the embodiments, examples and uses are intended to be encompassed by the claims attached hereto. The entire disclosure of each patent and publication cited herein is incorporated by reference, as if each such patent or publication were individually incorporated by reference herein. Various features and advantages of the invention are set forth in the following claims.

The invention claimed is:

1. A method of filtering water, the method comprising the steps of:
    providing a membrane module including a first end and a second end, a core including at least one passageway near the first end, a plurality of fibers that are helically wound in layers around the core, wherein the plurality of fibers are capable of filtering water, and an impervious wrap positioned around the plurality of fibers, the impervious wrap including at least one opening near the second end;
    feeding water to be treated through the at least one passageway into the mono helix such that the water to be treated flows parallel to a longitudinal axis of the mono helix and flows between the core and the impervious wrap through the mono helix from the first end to the second end, wherein a packing fraction of the plurality of fibers increases toward the second end such that an open cross-sectional area where fluid flows between the plurality of fibers decreases as water flows from the first end to the second end; and
    discharging filtered water from the second end.

2. The method of claim 1 wherein the plurality of fibers are hydrophilic.

3. The method of claim 1 further including the step of configuring the plurality of fibers for outside-in filtration.

4. The method of claim 1 further including the step of applying at least one of a pressurized feed of fluid to be treated and a vacuum to the plurality of fibers in order to draw permeate water through lumens of the plurality of fibers.

5. The method of claim 1 wherein the plurality of fibers include pores up to about 10 microns in diameter.

6. The method of claim 1 wherein the core is a porous hollow cylinder.

7. The method of claim 1 wherein the core is porous and is used to aerate the mono helix.

8. The method of claim 1 wherein at least one end of the plurality of fibers are potted and coupled to a permeate manifold.

9. The method of claim 1 wherein a plurality of mono helixes are coupled together to a permeate manifold to create a submersible module.

10. The method of claim 1 wherein the mono helix is positioned inside a cylindrical housing.

11. The method of claim 1 further including the step of drawing permeate water out of lumens of the plurality of fibers from at least one end of the plurality of fibers.

12. The method of claim 1 wherein the mono helix is more dense in an interior layer than an exterior layer.

13. The method of claim 1 wherein the mono helix includes along its length at least one of varying pore sizes, patterned porosities, varying fiber cross-sectional shapes, varying fiber textures, and varying fiber dimensions.

14. The method of claim 1 wherein the module is used in one of a drinking water purification system, a wastewater treatment system, and an industrial process water treatment system.

15. A membrane module including a first end and a second end, the membrane module comprising:
    a core including at least one passageway near the first end;
    a plurality of fibers that are helically wound in layers around the core, the plurality of fibers capable of filtering water; and
    an impervious wrap positioned around the plurality of fibers, the impervious wrap including at least one opening near the second end;
    the plurality of fibers creating a mono helix through which water to be treated flows parallel to a longitudinal axis of the mono helix, water to be treated flowing through the at least one passageway into the mono helix and then flowing between the core and the impervious wrap through the mono helix from the first end to the second end,
    a packing fraction of the plurality of fibers increasing toward the second end such that an open cross-sectional area where fluid flows between the plurality of fibers decreases as water flows from the first end to the second end,
    the core being porous and a packed bed of filtration media positioned inside the core.

16. A membrane module including a first end and a second end, the membrane module comprising:
    a core including at least one passageway near the first end;
    a plurality of fibers that are helically wound in layers around the core, the plurality of fibers capable of filtering water; and
    an impervious wrap positioned around the plurality of fibers, the impervious wrap including at least one opening near the second end;
    the plurality of fibers creating a mono helix through which water to be treated flows parallel to a longitudinal axis of the mono helix, water to be treated flowing through the at least one passageway into the mono helix and then flowing between the core and the impervious wrap through the mono helix from the first end to the second end;

the core being porous and further comprising an ultraviolet light source positioned inside of the core.

17. A membrane module including a first end and a second end, the membrane module comprising:
    a core including at least one passageway near the first end;
    a plurality of fibers that are helically wound in layers around the core, the plurality of fibers capable of filtering water; and
    an impervious wrap positioned around the plurality of fibers, the impervious wrap including at least one opening near the second end;
    the plurality of fibers creating a mono helix through which water to be treated flows parallel to a longitudinal axis of the mono helix, water to be treated flowing through the at least one passageway into the mono helix and then flowing between the core and the impervious wrap through the mono helix from the first end to the second end;
    the mono helix including along its length varying fiber dimensions with varying lumen sizes.

18. A membrane module including a first end and a second end, the membrane module comprising:
    a core including at least one passageway near the first end;
    a plurality of fibers that are helically wound in layers around the core, the plurality of fibers capable of filtering water; and
    an impervious wrap positioned around the plurality of fibers, the impervious wrap including at least one opening near the second end;
    the plurality of fibers creating a mono helix through which water to be treated flows parallel to a longitudinal axis of the mono helix, water to be treated flowing through the at least one passageway into the mono helix and then flowing between the core and the impervious wrap through the mono helix from the first end to the second end;
    the mono helix including varying surface structure along its length.

19. A membrane module including a first end and a second end, the membrane module comprising:
    a core including at least one passageway near the first end;
    a plurality of fibers that are helically wound in layers around the core, the plurality of fibers capable of filtering water;
    an impervious wrap positioned around the plurality of fibers, the impervious wrap including at least one opening near the second end;
    the plurality of fibers creating a mono helix through which water to be treated flows parallel to a longitudinal axis of the mono helix, water to be treated flowing through the at least one passageway into the mono helix and then flowing between the core and the impervious wrap through the mono helix from the first end to the second end; and
    a filtration media wrapped between fibers in the mono helix.

* * * * *